(12) United States Patent
Slobodskoy et al.

(10) Patent No.: US 11,461,220 B2
(45) Date of Patent: Oct. 4, 2022

(54) TECHNIQUES TO IDENTIFY IMPROPER INFORMATION IN CALL STACKS

(71) Applicant: INTEL CORPORATION, Santa Clara, CA (US)

(72) Inventors: Vitaly Slobodskoy, Nizhny Novgorod (RU); Andrey Isakov, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 84 days.

(21) Appl. No.: 16/958,660

(22) PCT Filed: Feb. 15, 2018

(86) PCT No.: PCT/IB2018/000276
§ 371 (c)(1),
(2) Date: Jun. 26, 2020

(87) PCT Pub. No.: WO2019/158961
PCT Pub. Date: Aug. 22, 2019

(65) Prior Publication Data
US 2021/0064514 A1 Mar. 4, 2021

(51) Int. Cl.
| | |
|---|---|
| *G06F 9/44* | (2018.01) |
| *G06F 11/36* | (2006.01) |
| *G06F 9/38* | (2018.01) |
| *G06F 11/34* | (2006.01) |

(52) U.S. Cl.
CPC ........ *G06F 11/3636* (2013.01); *G06F 9/3859* (2013.01); *G06F 11/3466* (2013.01); *G06F 11/3612* (2013.01)

(58) Field of Classification Search
CPC .............. G06F 11/3636; G06F 9/3859; G06F 11/3466; G06F 11/3612
See application file for complete search history.

(56) References Cited

U.S. PATENT DOCUMENTS

| | | | | |
|---|---|---|---|---|
| 6,009,517 A | * | 12/1999 | Bak ........................ | G06F 9/461 712/245 |
| 7,870,541 B1 | * | 1/2011 | Deshpande ........... | G06F 9/4484 717/124 |
| 2005/0198645 A1 | * | 9/2005 | Marr ..................... | G06F 21/606 719/310 |

(Continued)

OTHER PUBLICATIONS

International Search Report and Written Opinion for the International Patent Application No. PCT/IB2018/000276, dated Oct. 15, 2018, 15 pages.

*Primary Examiner* — Hang Pan
(74) *Attorney, Agent, or Firm* — KDB Firm PLLC

(57) ABSTRACT

Embodiments are disclosed for obtaining a call stack for binaries, where the call stack includes a sequence of frames, and each frame has a "from" address and a "to" address for a call instruction, and for determining basic blocks of instructions for the binaries, where each basic block of instruction has one or more instructions. Further, the embodiments include traversing the call stack to validate from/to address pairs of sequential frames based on control flow routes existing between "from" addresses and "to" addresses of the from/to address pairs, where each from/to address pair has a "from" address of a frame and a "to" address of an immediate previous frame on the call stack.

25 Claims, 11 Drawing Sheets

(56) References Cited

U.S. PATENT DOCUMENTS

| | | |
|---|---|---|
| 2005/0210454 A1 | 9/2005 | DeWitt, Jr. et al. |
| 2011/0214109 A1 | 9/2011 | Pedersen |
| 2012/0311307 A1* | 12/2012 | Chynoweth ........... G06F 9/3016 |
| | | 712/234 |
| 2014/0082329 A1* | 3/2014 | Ghose ................... G06F 9/3877 |
| | | 712/208 |
| 2015/0220333 A1* | 8/2015 | Soeder ...................... G06F 8/53 |
| | | 717/123 |
| 2017/0032118 A1* | 2/2017 | Carson ................... G06F 21/52 |

* cited by examiner

TECHNIQUES TO IDENTIFY IMPROPER INFORMATION IN CALL STACKS

CROSS-REFERENCE TO RELATED APPLICATION

This application is a national stage application claiming the benefit of and priority to International Application No. PCT/IB2018/000276 entitled "TECHNIQUES TO IDENTIFY IMPROPER INFORMATION IN CALL STACKS" filed Feb. 15, 2018, which is hereby incorporated by reference in its entirety.

TECHNICAL FIELD

Embodiments described herein include techniques to identify improper information in call stacks and perform corrections to remove the improper information.

BACKGROUND

As technology advances, computer systems include greater numbers of processors, which may include one or more cores, e.g., multi-core processors, that can execute multiple threads concurrently. The ever-increasing number of cores and logical processors in a system enables more software threads to be executed. While this trend benefits users in the form of increased processing power and computation ability, difficulties can arise due to increasing complexity. Various tools exist to identify performance-critical code sections (hotspot functions) to enable developers to fine tune code and improve processing performance. One such tool includes collecting call stacks to expose analyzed application flow. However, current solutions fail to account operating system context switching that may provide wrong and unreliable hardware based call stacks where multiple threads share a processor core.

DETAILED DESCRIPTION

Figure 1:
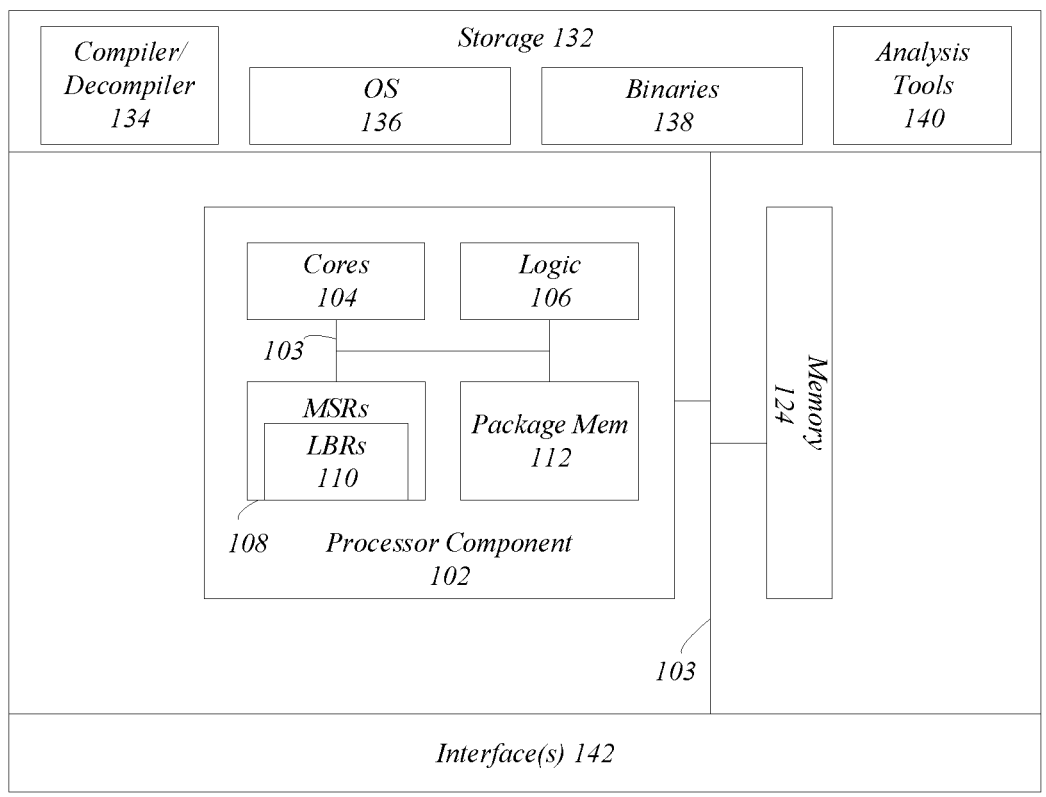
FIG. 1 illustrates an example of a computing system.

Various embodiments are generally directed enabling software developers to more accurately identify hotspot functions while taking into account operating system context switching that may provide wrong and unreliable call stacks where multiple threads share a processor core. Embodiments include using static analysis of binaries collected during execution of processes to determine whether execution paths exist between to/from address pairs. More specifically, a control flow route from a "to" address of a previous frame and a "from" address of a current address should always be traceable in a valid call stack. Thus, if a control flow route cannot be traced between a to/from address pair, a developer and the system discussed herein may determine that the call stack includes improper information and take mitigating actions, e.g., notifying the developer and removing the frame including the "to" address and subsequent frames from the call stack for reconstruction.

Moreover, embodiments include obtaining a call stack for binaries executing in a process, e.g., the process of collecting performance data of one or more call functions, where the call stack includes a plurality of frames and each frame includes a "from" address and a "to" address for a call instruction. A system may determine basic blocks of instructions for the binaries, wherein each basic block of instruction includes one or more instructions and traverse the call stack to validate the from/to address pairs of sequential frames based on a control flow route existing between "from" addresses and "to" addresses of the from/to address pairs. These and other details will become more apparent in the follow description.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example embodiment of a system 100 in which aspects of the present disclosure may be employed to analyze a binary and a call stack to detect improper information in the call stack and remove the improper information from the call stack. For example, embodiments discussed herein can detect wrong or improper functions represented in a call stack due to context switching between pairs of last branch record registers. The information associated with the improper functions may be removed from the call stack.

In embodiments, the system 100 may be a computing device, such as a personal computer, desktop computer, tablet computer, netbook computer, notebook computer, laptop computer, a mobile computing device, a server, server farm, blade server, a rack-based server, a rack-based processing board, and so forth. Embodiments are not limited in this manner.

In embodiments, the system 100 includes devices, circuitry, memory, storage, and components to perform operations discussed herein. In the illustrated example, the system 100 includes a processor component 102, such as processing circuitry, which may be a central processing unit (CPU), multi-component packet (MCP), or the like. The processor component 102 can include one or more cores 104 and package memory 112. The package memory 114 may be volatile memory, such as cache that can be used by the other components of the processor component 102 to process information and data, for example. The processor component 102 may include logic 106, which may be one or more instructions stored in a memory and/or hardwired in circuitry to perform one or more operations. For example, the logic 106 may be part of the performance monitoring unit (PMU) for the processor component 102 to monitor resources of the processor component 102, such as the cores 104 (clock ticks, frequency, cache hits and misses), memory controller(s), interconnects, and so forth.

The processor component 102 includes registers, such as model specific registers (MSRs) 108 to store information, such as debugging information, execution tracing, performance information, and last branch records (LBRs) 110. In embodiments discussed herein, an LBR 110 may provide a specific performance recording facility available in the processor component 102. The LBRs 110 may provide an inexpensive and accurate call stack for performance monitoring, e.g., an LBR call stack. However, embodiments are not limited in this regard and as mentioned above, embodiments can store the call stack in other types of storage units, both internal and external to the processor component 102.

In embodiments, an LBR call stack may be within the PMU of the processor component 102, and can maintain a call stack for the purpose of performance monitoring. Note that an LBR call stack may be independent from the actual system call stack or other stacks stored in memory 124 and used during program execution. Such conventional call stacks are data structures that store information about active subroutines or functions of a program. The LBR call stack or more generally call stack are used to denote storage of function calling information in a given storage location such as available last branch record recording facilities of the processor component 102 in frames that may include call information, e.g., to and "from" address information. The call and return instructions may constitute branch operations. Moreover, the LBRs 110, which may be implemented as a register stack and configured as a circular buffer, may be programmed to operate as a call stack. In turn, this call stack can be read by a collection driver that is triggered based on an occurrence of an event. By reading the contents of the LBRs 110 at this collection point, a call stack can be obtained.

In some embodiments, a call stack may be collected based on a user setting to catch execution of a program at a certain point, when an event occurs, such as an overflow event or when an event reaches a preprogrammed number of instances defined by a sample value, which may be stored in a configuration register. An interrupt to cause collection of the call stack may occur or be triggered upon the occurrence of a certain point of execution being reached or an occurrence of an event, for example.

As mentioned, the call stack may be a buffer or ring buffer. Thus whenever a call instruction is encountered during application or binary execution, the instruction address of the call ("from" address) and the destination address ("to" address) are pushed onto the call stack. The "from" address and "to" address values are written into an entry or frame of the call stack. The from and "to" addresses are then popped off the stack, that is, these values are cleared, when a matching return is encountered. In some embodiments, the LBR 110 unit may include 16 register pairs, e.g., each LBR 110 may store 16 frames, and other instances, the LBR 110 may include 32 register pairs and store up to 32 frames. In various embodiments, using the LBR 110 as a call stack allows a software performance analysis tool to obtain call stacks to any performance monitoring event of interest. As such, this mechanism can be used to detect frames from different software threads caused by the operating system (OS) 136 performing context switching where the different software threads share the same core 104. This is generally the main cause of invalid data for the thread of interest that may end up on the call stack. However, embodiments are not limited in this manner.

In some instances, the LBRs 110 (and call stacks) may be stored in a set of machine or MSRs 108. For example, the processor component 102 may include a call stack of MSRs for storing information regarding the most recently taken branches of any type, e.g., function calls and returns, jumps, interrupts, exceptions, and so forth. A branch record or frame includes a pair of registers, one of which to store a "from" address and the other to store a "to" address which may be linear addresses, in embodiments. In some implementations, the registers may be automatically read, while in other embodiments a control signal may cause the call stack to send branch records as branch trace messages (BTMs) to a selected destination location, such as memory 124 or storage 132 to perform performance analysis on the call stack. Note that operation of MSRs 108 can be controlled to be enabled or disabled and further controlled to operate in a call stack mode. For example, an LBR flag may be present in a debug control MSR 108 to enable the processor component 102 to automatically record branch records for taken branches and another flag may enable the call stack mode.

The number of MSRs 108 used for a call stack can vary in different embodiments. For example, in different implementations, the size of the call stack can be 16, as previously mentioned. However, in other implementations, the call stack may store 4 or 8 frames (from/to pairs). Embodiments are not limited in this regard. As described above, last branch recording mechanisms may track not only branch instructions (like jumps, loops and call instructions), but also other operations that cause a change in the instruction pointer (like external interrupts, traps and faults). In various embodiments, output filtering options can be available for the LBRs so that only certain types of instructions can be tracked. For example, the LBRs can be controlled to only store information regarding function calls and returns.

In embodiments, a static analysis of one or more binaries 138 may be performed to ensure that an associated call stack includes the proper information, e.g., the call stack includes frames for a single thread that is associated with the binaries 138 and form a meaningful execution path. Each call stack frame or pair of LBR registers includes a "from" address and a "to" address of a function call, as previously mentioned, and can be assumed to be a correct pair of addresses. Further, to ensure that the call stack includes correct information, a determination may be made as to whether the current "from" address is reachable from the immediate previous "to" address of the immediately previous frame on the call stack. The immediate previous frame is one that was put on the call stack immediately before the current frame being checked, e.g., the frame below the current frame from a top-down perspective. The current frame "from" address may be reachable from the immediate previous "to" address if a control flow route between the current "from" address and the immediate previous "to" address can be traced between basic blocks of instructions generated based on the binary 138. The call stack may be sequentially traversed top down to verify pairs of from and previous "to" addresses. The call stack may be traversed until the bottom of the call stack is reached, indicating that the information in the call stack is correct, or until a control flow route cannot be traced between a "from" address and an immediate previous "to" address indicating incorrect information in the call stack.

The system 100 may include other components, such as memory 124, storage 132, and one or more interfaces 142. The memory 124, storage 132, and the one or more interfaces 142 may be coupled via one or more interconnects 103. In embodiments, the memory 124 may be one or more of volatile memory including random access memory (RAM) dynamic RAM (DRAM), static RAM (SRAM), double data rate synchronous dynamic RAM (DDR SDRAM), SDRAM, DDR1 SDRAM, DDR2 SDRAM, SSD3 SDRAM, single data rate SDRAM (SDR SDRAM), DDR3, DDR4, and so forth. Embodiments are not limited in this manner, and other memory types may be contemplated and be consistent with embodiments discussed herein. For example, the memory 124 may be a three-dimensional crosspoint memory device, or other byte addressable write-in-place nonvolatile memory devices. In embodiments, the memory devices may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory based device, a magnetic tunneling junction (MTJ) based device, a DW (Domain Wall) and SOT (Spin-Orbit Transfer) based device, a thyristor-based memory device, or a combination of any of the above, or other memory.

In embodiments, the system 100 includes one or more interface(s) 142 to communicate data and information with other compute systems, for example. An interface 142 may be capable of communicating via a fabric network or an Ethernet network, optically and/or electrically. Examples of an interface 142 include a Universal Serial Bus (USB) ports/adapters, IEEE 1394 Firewire ports/adapters, and so forth. Additional examples of interfaces 142 include parallel interfaces, serial interfaces, and bus interfaces. Embodiments are not limited in this manner.

In embodiments, the system 100 includes storage 132, such as non-volatile storage, which may further include an operating system 136 and system software that manages the system's 100 hardware and software resources and to provide common services for computer programs, software applications, and hardware components. The operating system 136 may be a Windows® based operating system, an Apple based on operating system, a Unix® based operating system, and so forth.

The storage 132 also includes a compiler 134 and one or more binaries 138. The binaries 138 can cause execution of one or more instructions to perform tasks. Further and as previously mentioned, call function information for the binaries 138 may be captured in a LBR call stack and used to perform static analysis of the call stack.

In embodiments, the compiler 134 includes a program or set of programs to translate source code into target text/code, such as the binaries 138. Further, storage 132 may include additional analysis tools 140, such as a disassembler capable of performing operations to disassemble the binaries 138 back into source code. The disassembler takes an executable binary 138 as input, and creates a source code file or disassembled code (assembly language), for example.

In embodiments, the analysis tools 140 may include a program capable of dividing the disassembled code into basic blocks of instructions and creating control flow. A basic block of instruction or "basic block" may be a straight-line code sequence with no branches in except to enter and no branches out except at the exit. Thus, each of the basic blocks may not have a control flow instruction in its body except for the last instruction, which can cause execution of code in a different basic block. To generate the basic blocks of instructions, an analysis tool 140 may scan over the disassembled code, marking block boundaries, e.g., instructions which may either begin or end a basic block because they either transfer control or accept control from another point. Then, the listing of code is divided at each of these points generating the basic blocks of instructions. Embodiments are not limited in this manner, and the basic blocks of instructions may be generated using other techniques.

In embodiments, an analysis tool 140 may generate a control flow graph having one or more control flow routes between the basic blocks of instructions. More specifically, each of the basic blocks of instructions forms the vertices or nodes in a control flow graph, and the edges are used to represent jumps in the control flow routes. The analysis tool 140 may generate the control flow graph based on the one or more instructions in the one or more basic blocks of instructions.

In embodiments, the system 100 may use a control flow graph to verify each of the pairs of from/to address pairs of sequential frames, which may each be attributed to a corresponding basic block by searching for a control flow route using an algorithm to determine whether a control route exists between the basic blocks attributed with the "from" address of the current frame and the "to" address of a previous frame, wherein the "from" address of the current frame is valid and the "to" address of the previous frame is to be validated. The frames are sequential on the call stack in that the "from" address is of a current frame and the "to" address is of an immediate previous frame, e.g., the frame having the "from" address is on top of the frame having the "to" address on the call stack. Note that the control flow route is determined from the opposite direction, e.g., from the "to" address to the "from" address ("to" address→"from" address). In embodiments, various algorithms may be utilized to trace the control flow route, such as a depth-first walk algorithm, a breadth-first algorithm, and so forth, may be used to traverse through the basic blocks of instructions to determine if a control flow route exists. If a control flow route can be determined between the pair of from/to addresses of sequential frames, e.g., from the "to" address to the "from" address, the frame having the "to" address may be validated, and the "from" address is already considered validated. However, if a control flow route cannot be determined between a pair of from/to addresses of sequential frames, the frame including the "from" address and all previous frames with all of its' callers in the call stack may be invalidated and removed from the call stack for reconstruction because they represent improper information.

Figure 2A:
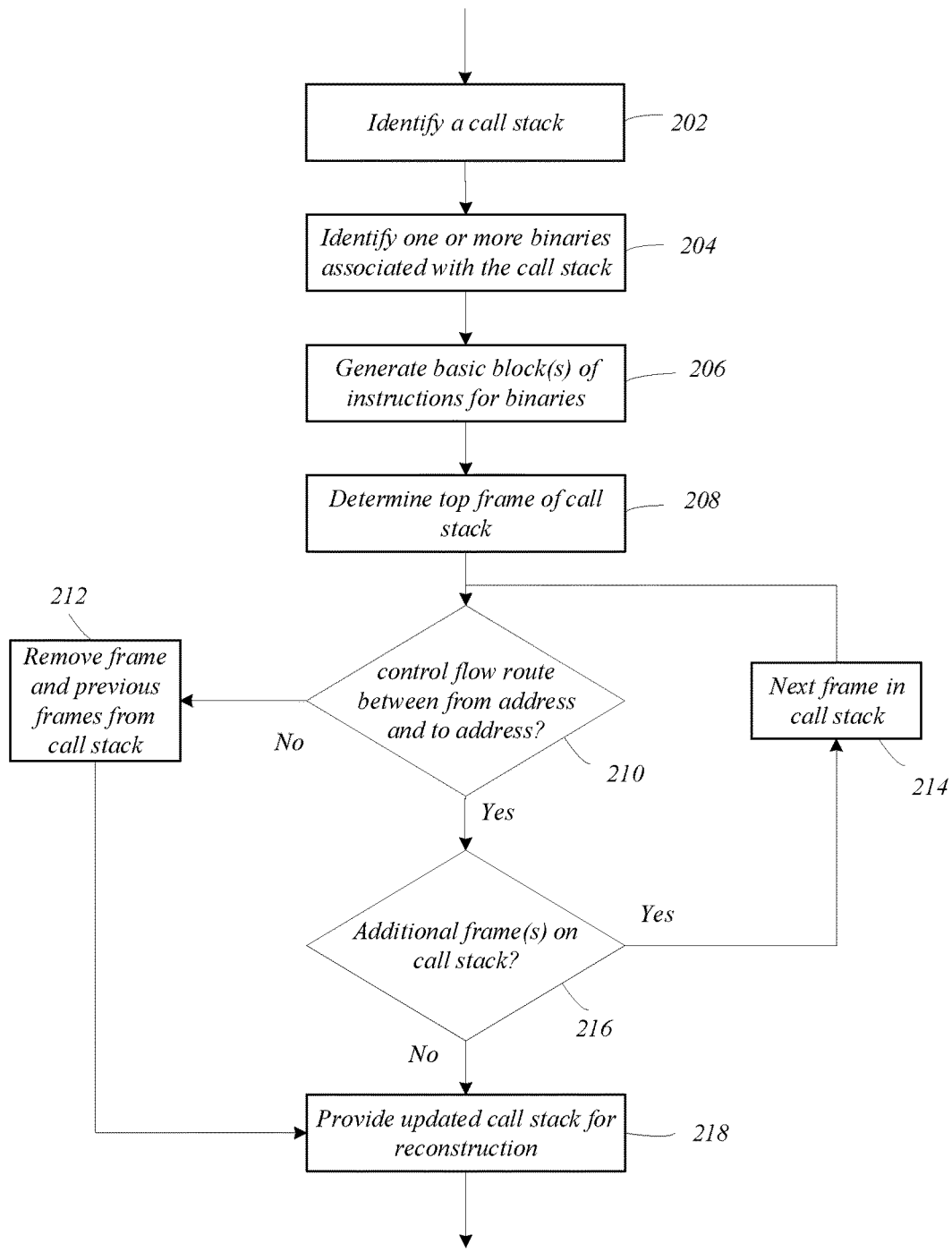
FIG. 2A illustrates an example of a first logic flow.

FIG. 2A illustrates one example logic flow 200 to determine whether a call stack includes correct information and/or identify incorrect information and remove the incorrect information from the call stack. More specifically, embodiments include validating from/to address pairs of sequential frames on the call stack. The logic flow 200 that may be representative of some or all the operations executed by one or more embodiments described herein. For example, the processing flow 200 may illustrate operations performed by system 100 including the compiler 134 and components of the processor component 102. However, embodiments are not limited in this manner, and one or more other components may perform operations to enable and support the operations discussed in this logic flow 200.

At block 202, the logic flow 200 includes identifying a call stack associated with binaries to perform an analysis on the call stack. In some embodiments, the system 100 may identify a call stack captured while binaries executed during a previous execution or currently executing, which may be stored in memory 124 or storage 132, for example. As mentioned, the call stack stores function calling information in a given storage location such as available last branch record recording facilities (MSRs) of the processor component 102 in frames that may include call information, e.g., to and "from" address information. Further and at block 204, the logic flow 200 includes identifying the binaries associated with the call stack to perform the analysis, e.g., determine whether the incorrect information is in the call stack.

At block 206, the logic flow 200 includes generating one or more basic blocks of instructions and a control flow diagram for the binaries. For example, the system 100 may disassemble the binaries to generate disassembled code. The system 100 may scan over the disassembled code, marking basic block boundaries, e.g., instructions which may either begin or end a basic block of instructions because they either transfer control or accept control from another point. The system 100 may divide the code up based on the boundary lines at the points to generate the basic blocks of instructions. Further, the system 100 may utilize the basic blocks of instructions and generate a control flow graph having one or more control flow routes between the basic blocks of instructions. More specifically, each of the basic blocks of instructions forms the vertices or nodes in a control flow graph, and the edges are used to represent flows or jumps in the control flow routes to one or more other basic blocks of instructions. The control flow graph may be utilized to determine whether a control flow route exists between from/to addresses of sequential frames of the call stack, e.g., a "from" address of a current frame and a "to" address of a previous frame on the call stack.

In embodiments, the logic flow 200 includes determining the top frame of the call stack at block 208. The top frame of the call stack may be used as a starting point to perform validation of the call function information in the call stack. In embodiments, the starting point may be provided from other sources, for example, the contents of the processor's instruction pointer from where the stack was captured are taken as the starting point ("from" address in the pair). As previously discussed, the call stack may be ordered from the top down, where the top frame includes the most recent call function information put onto the call stack.

At block 210, the logic flow includes determining whether a control flow route exists from a "to" address of the immediately previous frame to a "from" address of a current frame. As mentioned, validation of the call function information may occur top down; thus, the immediate previous frame may be the next frame below the frame with "from" address.

In embodiments, the system 100 may verify that a control flow route exists between the "from" address and the "to" address of the previous frame utilizing the control flow graph based on the disassembled binaries. More specifically, the system 100 may determine the basic block associated with or having the "from" address and the basic block associated with or having the "to" address. For example, the system 100 including the analysis tools 140 may search each basic block of instruction for the call function associated with the frame of "from" address and the frame of the "to" address. The system 100 may determine whether a control flow route exists between the determined basic blocks of instruction, e.g., a path of execution between the "from" address and the "to" address.

If a control flow route does not exist, the logic flow 200, at block 212, includes invalidating the frame with the "to" address and removing the frame and all previous frames from the call stack, e.g., the frames below the frame having the "from" address when the call stack is utilized top down. The updated call stack may be provided to system analysis tools, the operating system, and so forth for reconstruction at block 218.

If a control route does exist, the logic flow 200, at block 216, includes validating the frame having the "to" address and determining if additional frames remain on the call stack for analysis. If no frames exist on the call stack for analysis, the call stack may be provided to system analysis tools, the operating system, and so forth for reconstruction at block 218.

If at least one frame does exist at block 216, the logic flow 200 includes determining the next frame to analyze to determine whether a control flow route exists between the next "from" address and the immediate previous address at block 214. The logic flow 200 may proceed to block 210 and this cycle may repeat until all of the frames of the call stack are analyzed or until a control flow route cannot be determined between at least one "from" address and a previous "to" address.

Figure 2B:
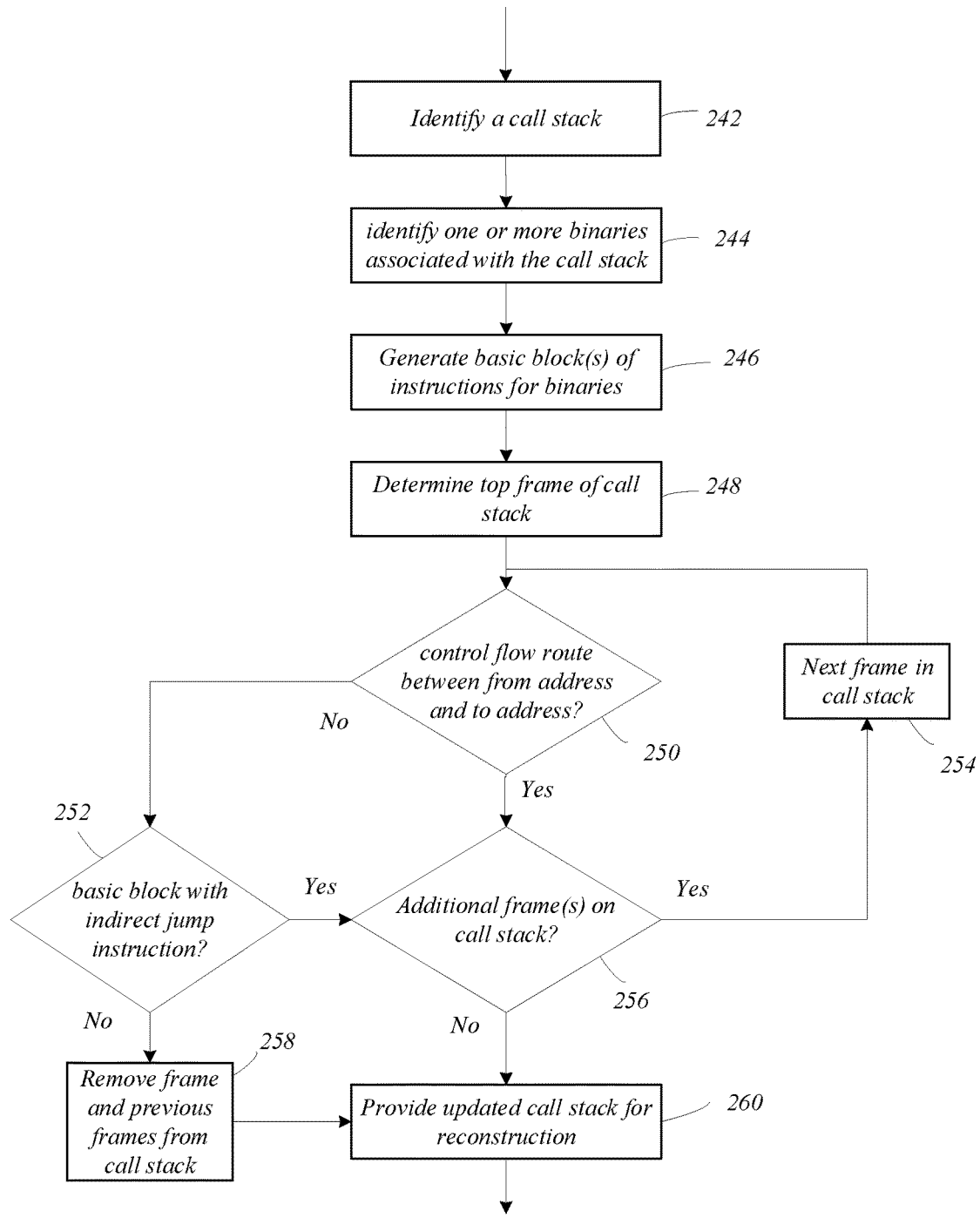
FIG. 2B illustrates an example of a second logic flow.

FIG. 2B illustrates a second example logic flow 240 to determine whether a call stack includes correct information and/or identify incorrect information and remove the incorrect information from the call stack, as similarly discussed above with respect to logic flow 200. However, in the illustrated logic flow 240, a determination whether an indirect jump instruction exists in a basic block when searching for a control flow route between a "from" address and a previous "to" address is made. If a control flow route is not found, but an indirect jump instruction exists, the frame having the "to" address may be considered valid. The logic flow 240 may be representative of some or all the operations executed by one or more embodiments described herein. For example, the logic flow 240 may illustrate operations performed by system 100 including the compiler 134 and components of the processor component 102. However, embodiments are not limited in this manner, and one or more other components may perform operations to enable and support the operations discussed in this logic flow 240.

In embodiments, blocks 242-250 of logic flow 240 may be the same as blocks 202-210 of logic flow 200. For example, block 242 includes identifying a call stack associated with binaries to perform an analysis on the call stack. In some embodiments, the system 100 may identify a call stack captured while the binaries are executed, which may be stored in memory 124 or storage 132, for example. Further and at block 244, the logic flow 240 includes identifying the binaries associated with the call stack to perform the analysis, e.g., determine whether incorrect information is in the call stack.

In embodiments, the logic flow 240, at block 246, includes generating one or more basic blocks of instructions and a control flow diagram for the binaries. At block 248, the logic flow 240 includes determining the top frame of the call stack. As previously discussed, the top frame of the call stack may be used as a starting point to perform validation of the call function information in the call stack.

At block 250, the logic flow 240 includes determining whether a control flow route exists between a "from" address of a frame and a "to" address of the immediate previous frame on the call stack. Note that the route is traced from the "to" address to the "from" address, the opposite direction than how they are located on the call stack. As previously mentioned, the frames are ordered from newest to oldest from top to bottom on the call stack. If a control flow route does not exist, the logic flow 240, at block 252, includes determining whether a basic block of instruction includes an indirect jump instruction when searching for a control flow route between the "from" address and a previous "to" address. In one example, the indirect jump instruction may be included within the basic block of instruction associated with the "from" address. In another example, the indirect jump instruction may be included within the basic block of instruction associated with the "to" address. However, embodiments are not limited in this manner. In another example, the indirect jump instruction may be in a basic block of instruction traversed when the system 100 was looking for a control flow route.

If a control flow route and indirect jump instruction do not exists, the logic flow 240, at block 258, includes invalidating the frame with the "to" address and removing the frame and all previous frames from the call stack, e.g., the frames below the frame having the "from" address when the call stack is utilized top down. The updated call stack may be provided to system analysis tools, the operating system, and so forth for reconstruction at block 260.

If a control flow route does not exist and a basic block searched does include an indirect jump instruction, the logic flow 240, at block 256, includes determining whether additional frames exist for analysis. Further, the logic flow 240 may validate the frame having the "to" address if a basic block does include an indirect jump instruction since the jump target of the indirect jump instruction cannot be determined from the LBR records (frames) nor by static binary analysis.

Moreover, if a control route does exist and/or an indirect jump instruction is found, the logic flow 240 may proceed to block 256 and includes validating the frame having the "to" address and determining if additional frames remain on the call stack for analysis. If no frames exist on the call stack for analysis, the call stack may be provided to system analysis tools, the operating system, and so forth for reconstruction at block 260.

If at least one frame does exist at block 256, the logic flow 200 includes determining the next frame to analyze to determine whether a control flow route exists between the next "from" address and the immediate previous address at block 254. The logic flow 240 may return and perform block 250, and this cycle may repeat until all of the frames of the call stack are analyzed or until a control flow route cannot be determined between at least one "from" address and a previous "to" address.

Figure 2C:
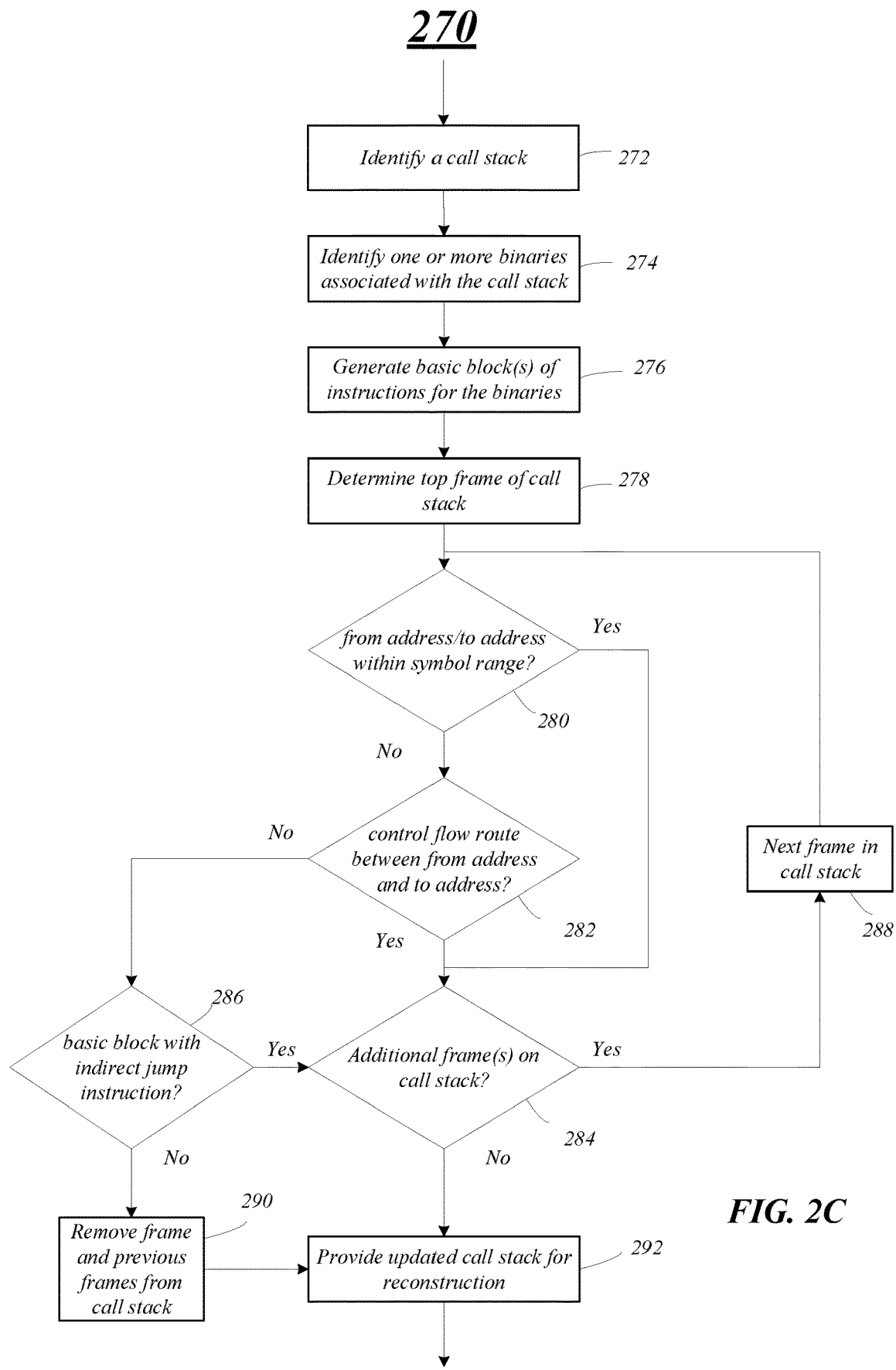
FIG. 2C illustrates an example of a third logic flow.

FIG. 2C illustrates a third example logic flow 270 to determine whether a call stack includes correct information and/or identify incorrect information and remove the incorrect information from the call stack, as similarly discussed above with respect to logic flows 200 and 240. In illustrated example, the logic flow 270 may include performing a pre-screening operation to reduce usage of computational resources. More specifically, embodiments include determining whether the "from" address and previous "to" address being analyzed are within the same function and symbol range. If the from/to address pair are within the same symbol range (function), the system 100 may validate the "to" address without generating or determining whether a control flow route exists between the pair. Thus, saving computational resources, e.g., processing and memory usage, when avoiding a trace. The logic flow 270 may be representative of some or all the operations executed by one or more embodiments described herein. For example, the logic flow 270 may illustrate operations performed by system 100 including the compiler 134 and components of the processor component 102. However, embodiments are not limited in this manner, and one or more other components may perform operations to enable and support the operations discussed in this logic flow 270.

In embodiments, blocks 272-278 of logic flow 270 may be the same as blocks 202-208 of logic flow 200 and blocks 242-248 of logic flow 240. For example, block 272 includes identifying a call stack associated with binaries to perform an analysis on the call stack. In some embodiments, the system 100 may identify a call stack captured while the binaries executed, which may be stored in memory 124 or storage 132, for example. Further and at block 274, the logic flow 240 includes identifying the binaries associated with the call stack to perform the analysis, e.g., determine whether incorrect information is in the call stack.

In embodiments, the logic flow 270, at block 276, includes generating one or more basic blocks of instructions and a control flow diagram for the binaries. At block 278, the logic flow 270 includes determining the top frame of the call stack. As previously discussed, the top frame of the call stack may be used as a starting point to perform validation of the call function information in the call stack.

At block 280, the logic flow 270 may include performing an initial check to determine if the "from" address and the previous "to" address are within the same function and symbol range. More specifically, the system 100 may determine symbol range information for both addresses based on information present in the binaries or debug information collected while collecting the call stack. The symbol range information may be used to determine whether the two addresses are within the same symbol range. If the two addresses are within the same symbol range, the logic flow 270 may proceed to block 284 and forgo tracing a control flow route between the from/to address pair.

However, if the two addresses are not within the same symbol range, e.g., not within the same function, the logic flow 270 may determine whether a control flow route exists between the "from" address and the "to" address of the immediate previous frame on the call stack at block 282. If a control flow route does not exist, the logic flow 270, at block 286, includes determining whether a basic block of instruction includes an indirect jump instruction when searching for a control flow route between the "from" address and a previous "to" address. In one example, the indirect jump instruction may be included within the basic block of instruction associated with the "from" address. In another example, the indirect jump instruction may be included within the basic block of instruction associated with the "to" address. However, embodiments are not limited in this manner. In another example, the indirect jump instruction may be in a basic block of instruction traversed when the system 100 was looking for a control flow route.

If a control flow route does not exist and a basic block searched does not include an indirect jump instruction, the logic flow 270, at block 290 includes invalidating the frame with the "to" address and removing the frame and all previous frames from the call stack, e.g., the frames below the frame having the "from" address when the call stack is utilized top down. The updated call stack may be provided to system analysis tools, the operating system, and so forth for reconstruction at block 292.

If a control flow route does not exist and a basic block searched does include an indirect jump instruction, the logic flow 270, proceeds to block 284. Further, the logic flow 270 may validate the frame having the "to" address if a basic block does include an indirect jump instruction since the jump target of the indirect jump instruction cannot be determined from the LBR records (frames) nor by static binary analysis.

If a control flow route does exist and/or an indirect jump instruction is found, the logic flow 270 may proceed to block 284 to validate the frame having the "to" address and determine if additional frames remain on the call stack for analysis. If no frames exist on the call stack for analysis, the call stack may be provided to system analysis tools, the operating system, and so forth for reconstruction at block 292.

If at least one frame does exist at block 284, the logic flow 270 includes determining the next frame to analyze to determine whether a control flow route exists between the next "from" address and the immediate previous address at block 288. The logic flow 270 may return and perform block 280, and this cycle may repeat until all of the frames of the call stack are analyzed or until a control flow route cannot be determined between at least one "from" address and a previous "to" address.

Figure 3:
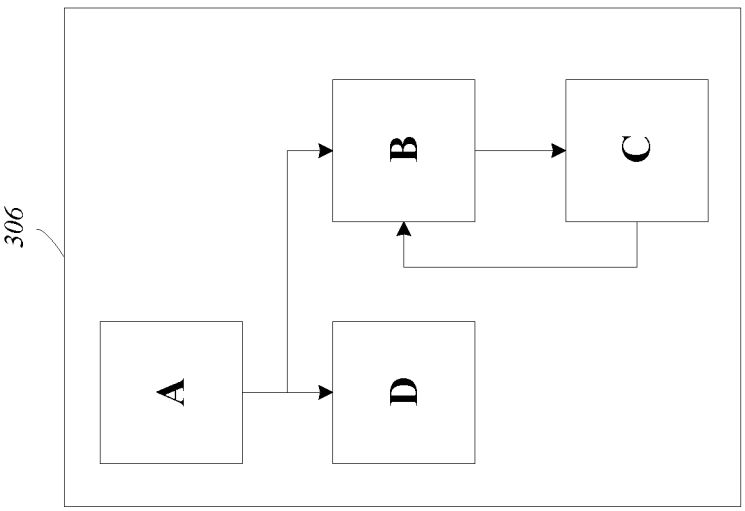
FIG. 3 illustrates an example of a processing flow diagram.
Figure 3:
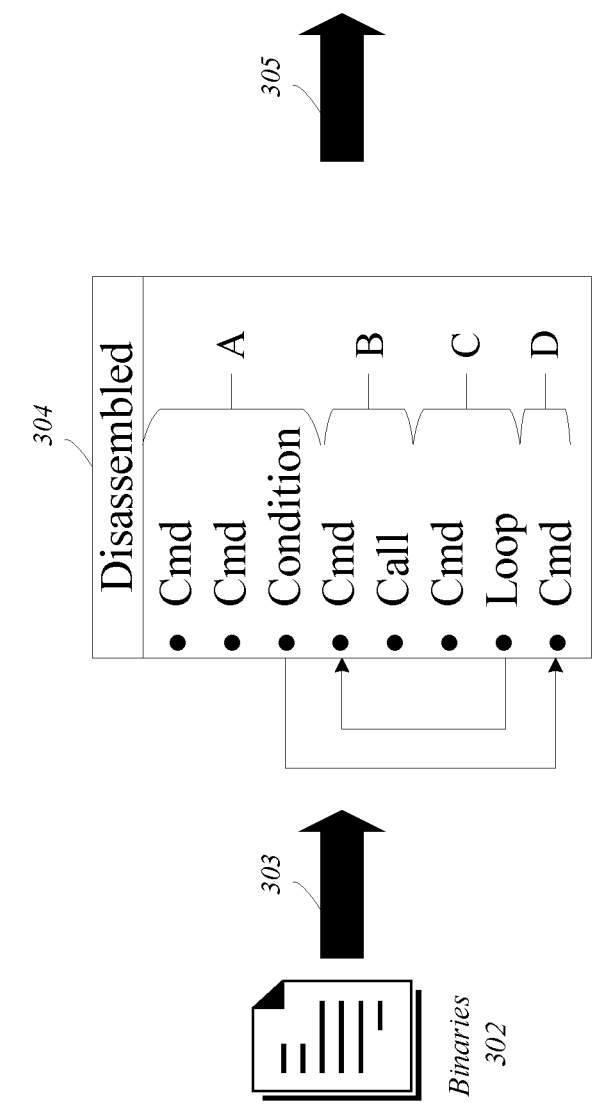

FIG. 3 illustrates an example of a processing flow 300 that may be representative of some or all the operations executed by one or more embodiments described herein to dissemble binaries and generate a control flow graph with control flow routes between basic blocks of instructions. For example, the processing flow 300 may illustrate one or more detailed operations performed by system 100 including the compiler 134 and analysis tools 140 that may occur of FIGS. 2A-2C. However, embodiments are not limited in this manner, and one or more other components may perform operations to enable and support the operations discussed in this processing flow 300.

At line 303, the processing flow 300 may include obtaining binaries 302 for analysis. The binaries may be associated with a call stack and call stack frames to perform the analysis, e.g., determine whether incorrect information is in the call stack. The identified binaries may be the binaries executed to generate information in the call stack, for example. In embodiments, the binaries may be obtained from memory or storage and may include executable instructions, which when executed by a processor component, causes one or more operations to be performed.

In embodiments, the processing flow 300 also includes disassembling the binaries using a disassembler to convert the binary back into assembly code or a set of instructions. In the illustrated example, the disassembler may disassemble the binaries 302 to generate disassembled code 304. The disassembled code 304 may include a number of function calls and commands, which may be further divided into basic blocks of instruction.

In embodiments, system analysis tool 140 may divide the disassembled code into basic blocks of instructions. Each of the basic blocks does not have a control flow instruction in its body except for the last instruction, which can cause execution of code in a different basic block. To generate the basic blocks of instructions, the compiler 134 may scan over the disassembled code, marking block boundaries, e.g., instructions which may either begin or end a basic block because they either transfer control or accept control from another point. Then, the listing of code is divided at each of these points generating the basic blocks of instructions. Embodiments are not limited in this manner, and the basic blocks of instructions may be generated using other techniques.

In the illustrated example, four basic blocks of instructions are generated, A, B, C, and D, each ending with a control flow instruction. For example, block A ends with a conditional control flow instruction, block B ends with a call control flow instruction, and block C ends with a loop control flow instruction. Block D ends with a command control flow instruction, which may end a function for the routine.

In embodiments, the analysis tool 140 may generate a control flow graph 306 having one or more control flow routes between the basic blocks of instructions A, B, C, and D at line 305. More specifically, each of the basic blocks of instructions form the vertices or nodes in a control flow graph and the edges are used to represent jumps in the control flow routes. In the illustrated example, the control flow graph 306 includes control flow routes between basic blocks A, B, C, and D based on the disassembled code 304. For example, the condition instruction of basic block A may direct flow of execution either to basic block D or basic block B. In another example, the call instruction in basic block B may direct flow of execution to basic block C. In a third example, the loop instruction of basic block C may redirect the flow of execution back to basic block B.

Figure 4:
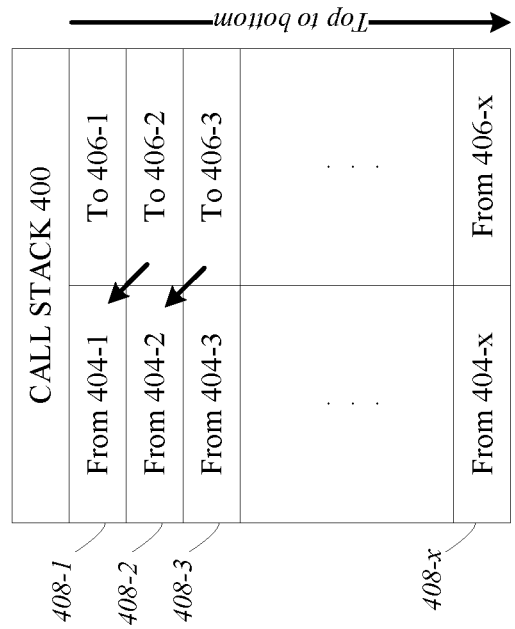
FIG. 4 illustrates an example of a call stack.

FIG. 4 illustrates an example of a call stack 400 that may be utilized with a binary to determine if the call stack 400 includes incorrect information. The call stack 400 may be an LBR call stack and include a number of LBRs in frames 408 including pairs of "from" addresses 404 and "to" addresses 406. The call stack 400 may include any number of frame 408-x having "from" addresses 404-x and "to" addresses 406-x, where x may be any positive integer. In one example, the call stack 400 may include 16 register pairs, e.g., each call stack 400 may store 16 frames 408. Embodiments are not limited in this and in some instances, the call stack 400 may store 32 frames 408, for example. In embodiments, the call stack 400 may be implemented as a register stack and configured as a circular buffer. In turn, the call stack 400 can be read by a collection driver that is triggered based on an occurrence of an event.

As mentioned, the call stack 400 may be a buffer or ring buffer, thus whenever a call instruction is encountered during application or binary execution the instruction address of the call ("from" address) 404 and the destination address ("to" address) 406 are pushed onto the call stack 400. Thus, the top of the call stack 400 includes information for the most recent call function. The "from" address 404 and "to" address 406 include values that are written into an entry or frame 408 of the call stack 400. The from and "to" address values are then popped off the call stack 400, that is, these values are cleared, when a matching return is encountered.

In embodiments, the call stack 400 may be analyzed from top to bottom to determine if a control flow routes exist between a "from" address 404-x and "to" address 406-(x+1) of a previous frame 408-(x+1), e.g., the next most recent frame pushed onto the call stack 400. In one example, the system 100 may determine whether a control flow route exists between the "from" address 404-1 and the "to" address 406-2, as illustrated by the arrow. Note that the trace is performed in "reverse direction" from the "to" address to the "from" address, as illustrated by the arrow pointing from the "to" address 406-2 to the "from" address 404-1. If a control flow route exists, the system 100 may then determine whether a control flow exists between the next address pair, the "from" address 404-2 and the "to" address 406-3. This process may repeat until the call stack 400 is fully analyzed or until control flow route is not detected for one of the from/to address pairs. Note that in some instances, the from/to address pair may first be analyzed to determine whether the pair is within the same function, e.g., symbol range, prior to tracing the control flow route, as discussed above in FIG. 2C. As discussed, the "to" address of the pair may be validated if they are within the same symbol range without tracing the route between the pair saving computational resource usage.

Figure 5A:
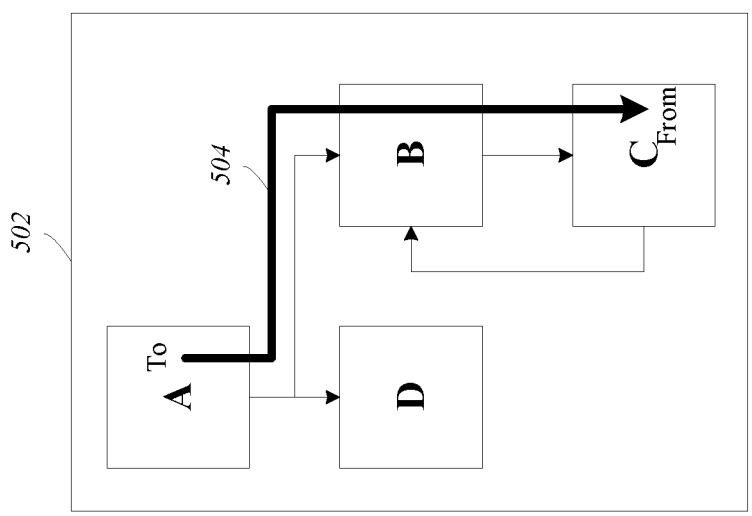
FIG. 5A illustrates a first example of control flow routes.

FIGS. 5A-5D illustrate examples of processing of control flow graphs 500, 520, 540, 560, and 580. For example, FIG. 5A illustrates a control flow graph 500 for a single function 502 to determine whether control flow routes exist between from/to address pairs. In this example, the "from" address may be associated with the basic block C and the "to" address may is associated with basic block A. The control flow route 504 exists between blocks A and C through basic block B. Thus, the from/to address pair is validated in this example.

Figure 5B:
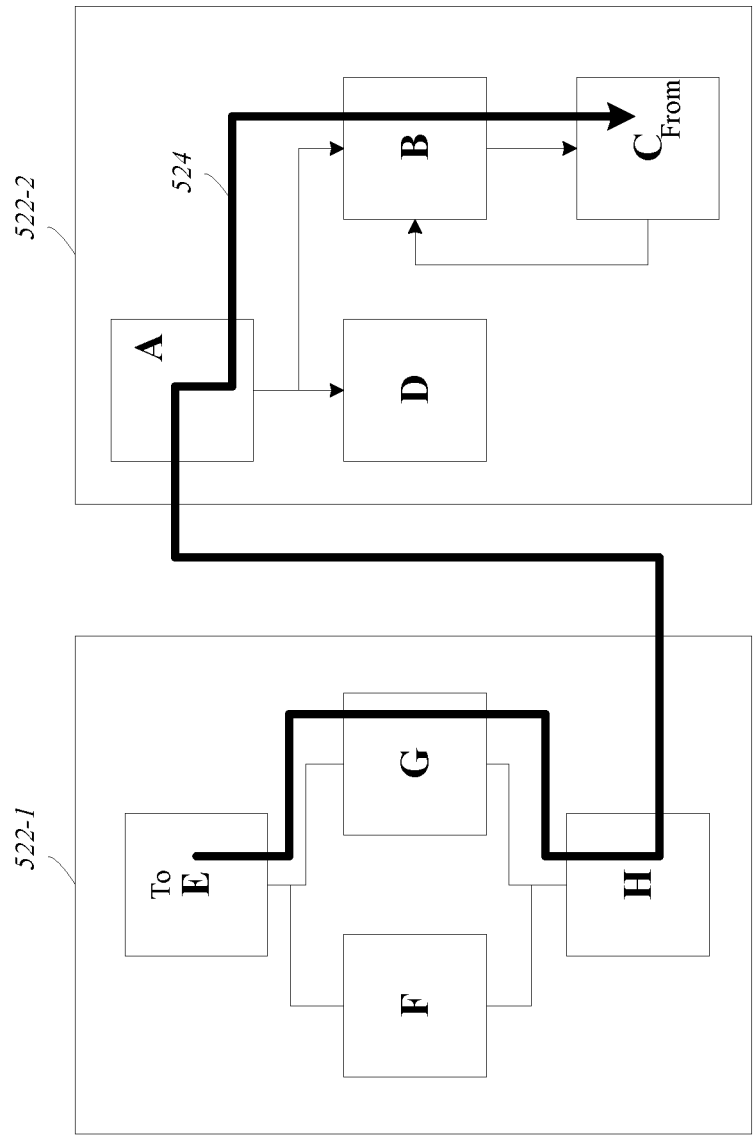
FIG. 5B illustrates a second example of control flow routes.

In another example, FIG. 5B illustrates a control flow graph 520 for multiple functions 522-1 and 522-2 to determine whether control flow routes exist between from/to address pairs. In this example, the "from" address may be associated with the basic block C and the "to" address may is associated with basic block E. The control flow route 524 exists between blocks E and C through basic blocks G, H, A, and B. In this example, the basic block H may include a direct jump instruction to basic block A and the flow of execution exists between the two functions 522-1 and 522-2. Thus, the from/to address pair is validated in this example. Note that in this example, a different control flow route between E and C may exist through blocks F, H, A, and B. Only one control flow route needs to exists to validate the from/to pair.

Figure 5C:
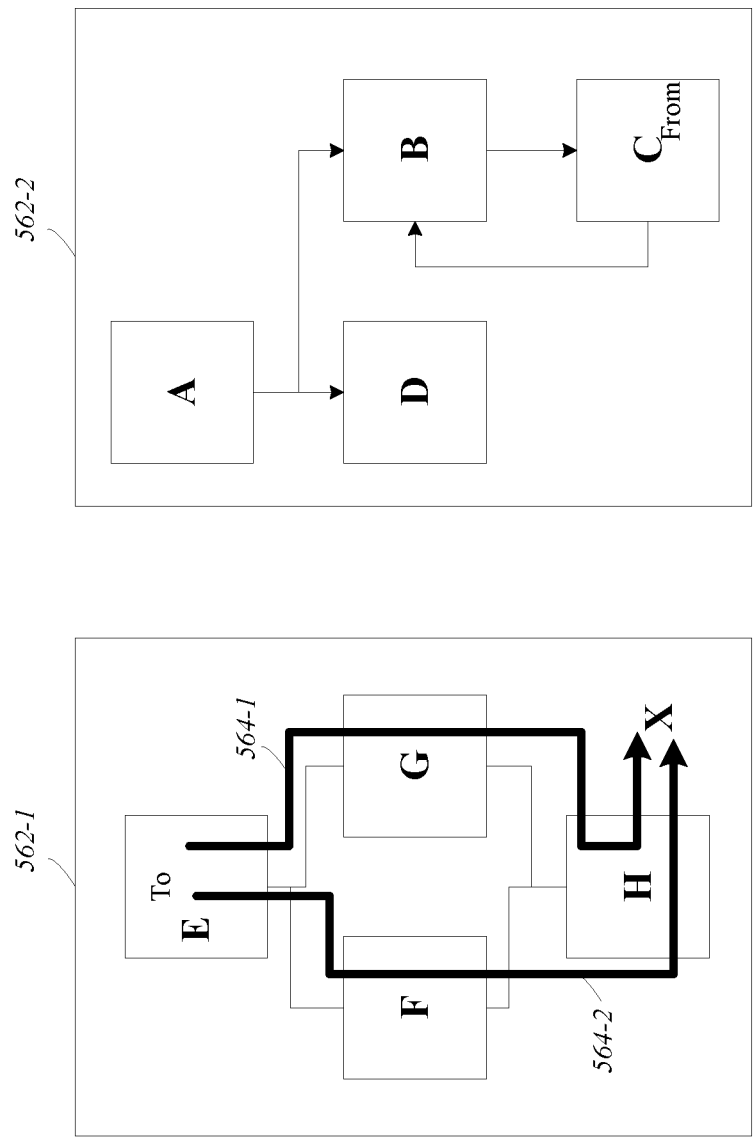
FIG. 5C illustrates a third example of control flow routes.

In another example, FIG. 5C illustrates a control flow graph 560 for multiple functions 562-1 and 562-2 to determine whether control flow routes exist between from/to address pairs. In this example, the "from" address may be associated with the basic block C and the "to" address may be associated with basic block E. In this example, neither control flow routes 564-1 and 564-2 are complete to basic block B associated with the "from" address. Thus, the from/to pair may be invalidated in this example. However, note that if block H includes an indirect jump instruction, the system may validate the from/to pair and analyze the next frame in the call stack. As mentioned, if a basic block does include an indirect jump instruction since the jump target of the indirect jump instruction cannot be determined from the LBR records (frames) nor by static binary analysis the "from" address being analyzed may be validated.

Figure 5D:
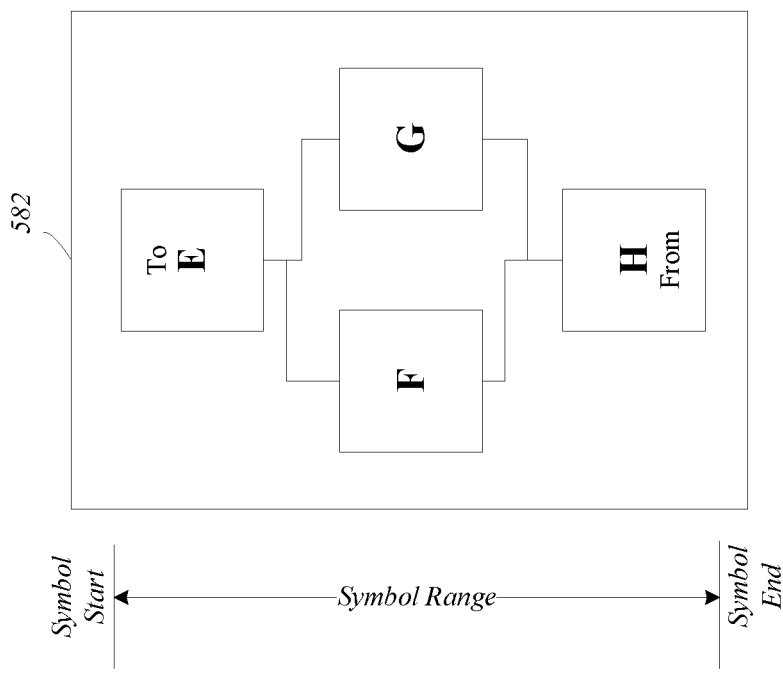
FIG. 5D illustrates an example of a function range of basic blocks of instructions.

FIG. 5D illustrates another example of a control flow graph 580 for function 582. In this example, the system 100 may perform an initial check to determine whether from/to address pairs are within the same function and symbol range. As previously discussed, from/to address pairs that we within the same function and symbol range may be validated without determining a control flow route exists between basic blocks. For example, if the "from" address is associated with basic block H and the "to" address is associated with basic block E, the from/to address pair may be validated without determining whether control flow route exists.

Figure 6:
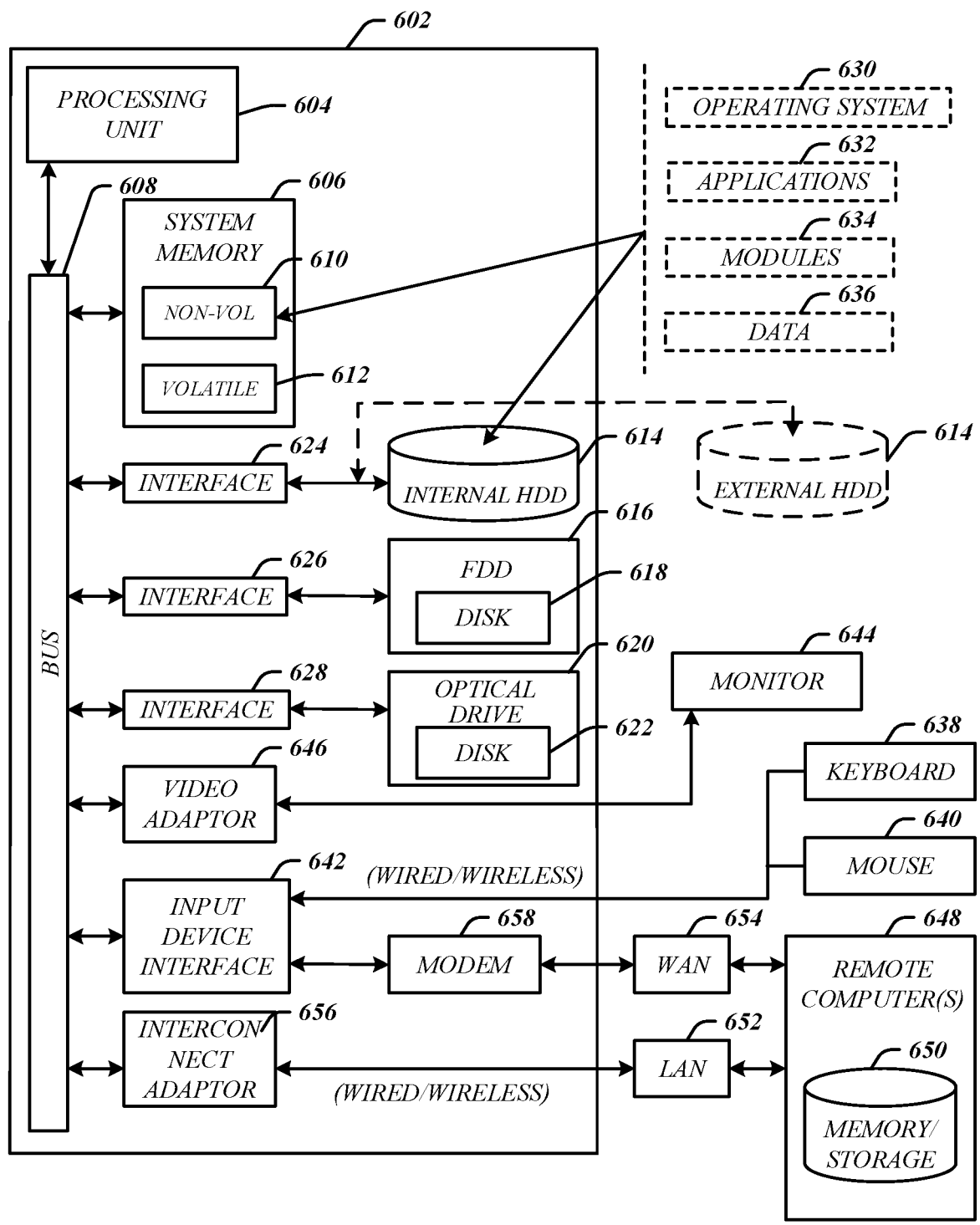
FIG. 6 illustrates an example embodiment of a computing architecture.

FIG. 6 illustrates an embodiment of an exemplary computing architecture 600 suitable for implementing various embodiments as previously described. In embodiments, the computing architecture 600 may include or be implemented as part of a node, for example.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 616, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 626, respectively. The HDD interface 624 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and components of the system 100.

A user can enter commands and information into the computer 602 through one or more wire/wireless input devices, for example, a keyboard 636 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and wireless communications to one or more remote computers, such as a remote computer 646. The remote computer 646 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 660 is illustrated. The logical connections depicted include wire/wireless connectivity to a local area network (LAN) 662 and larger networks, for example, a wide area network (WAN) 664. Such LAN and WAN networking environments are commonplace in offices and companies and facilitate enterprise-wide computer networks, such as intranets, all of which may connect to a global communications network, for example, the Internet.

When used in a LAN networking environment, the computer 602 is connected to the LAN 662 through a wire and/or wireless communication network interface or adaptor 666. The adaptor 666 can facilitate wire and/or wireless communications to the LAN 662, which may also include a wireless access point disposed thereon for communicating with the wireless functionality of the adaptor 666.

When used in a WAN networking environment, the computer 602 can include a modem 666, or is connected to a communications server on the WAN 664, or has other means for establishing communications over the WAN 664, such as by way of the Internet. The modem 666, which can be internal or external and a wire and/or wireless device, connects to the system bus 608 via the input device interface 642. In a networked environment, program modules depicted relative to the computer 602, or portions thereof, can be stored in the remote memory/storage device 660. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.116 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five provided below are intended to be exemplary and non-limiting.

In a first example, embodiments may include a system, device, apparatus, and so forth to obtain a call stack for binaries, the call stack comprising a plurality of frames, each frame comprising a "from" address and a "to" address for a call instruction, determine basic blocks of instructions for the binaries, each basic block of instruction comprising one or more instructions, and traverse the call stack to validate from/to address pairs of sequential frames based on control flow routes existing between "from" addresses and "to" addresses of the from/to address pairs through the basic blocks of instructions, each from/to address pair comprising a "from" address of a frame and a "to" address of an immediate previous frame on the call stack.

In a second example and in furtherance of any previous examples, embodiments may include a system, device, apparatus, and so forth to attempt to trace a control flow route from a "to" address to a "from" address of an from/to address pair through the basic blocks of instruction, validate the frame having the "to" address when at least one control flow route can be traced, and invalidate the frame having the "to" address and previous frames on the call stack when at least on control flow route not exist.

In a third example and in furtherance of any previous examples, embodiments may include a system, device, apparatus, and so forth to include processing circuitry to traverse the call stack from top to bottom until the call stack is fully traversed or at least one control flow route does not exist between a from/to address pair.

In a fourth example and in furtherance of any previous examples, embodiments may include a system, device, apparatus, and so forth to include the processing circuitry to disassemble the binaries prior to the determination of the basic blocks of instructions and use the disassembled binaries to determine the basic blocks of instructions.

In a fifth example and in furtherance of any previous examples, embodiments may include a system, device, apparatus, and so forth to include processing circuitry to wherein each basic block of instruction to end with a respective control flow instruction based on a flow of execution through a basic block of instruction.

In a sixth example and in furtherance of any previous examples, embodiments may include a system, device, apparatus, and so forth to include determine that at least one of the basic block of instructions includes an indirect jump instruction when no control flow route exists between a "from" address of a frame and a "to" address of an immediate previous frame, and indicate the immediate previous frame having the "to" address is valid.

In a seventh example and in furtherance of any previous examples, embodiments may include a system, device, apparatus, and so forth to include processing circuitry to process wherein one or more control flow routes defines one of a path of execution through the basic blocks of instructions through a function, and defines the path of execution through the basic block of instructions through two or more different functions.

In an eighth example and in furtherance of any previous examples, embodiments may include a system, device, apparatus, and so forth to include the processing circuitry to determine that a "from" address for a frame and "to" address of an immediate previous frame are within a same symbol range, and validate the immediate previous frame without determining whether at least one control flow route exists between the "from" address of the frame and the "to" address of the immediate previous frame on the call stack.

In a ninth example and in furtherance of any previous examples, embodiments may include a system, device, apparatus, and so forth to include storage to store the call stack, and the processing circuitry to obtain the call stack for the binaries from the storage.

In a tenth example and in furtherance of any previous examples, a computer implemented method includes obtaining a call stack for binaries, the call stack comprising a plurality of frames, each frame comprising a "from" address and a "to" address for a call instruction, determining basic blocks of instructions for the binaries, each basic block of instruction comprising one or more instructions, and traversing the call stack to validate from/to address pairs of sequential frames based on control flow routes existing between "from" addresses and "to" addresses of the from/to address pairs through the basic blocks of instructions, each from/to address pair comprising a "from" address of a frame and a "to" address of an immediate previous frame on the call stack.

In an eleventh example and in furtherance of any previous examples, a computer implemented method includes attempting to trace a control flow route from a "to" address to a "from" address of an from/to address pair through the basic blocks of instruction, validating the frame having the "to" address when at least one control flow route can be traced, and invalidating the frame having the "to" address and previous frames on the call stack when at least on control flow route not exist.

In a twelfth example and in furtherance of any previous examples, a computer implemented method includes traversing the call stack from top to bottom until the call stack is fully traversed or at least one control flow route does not exist between a from/to address pair.

In a thirteenth example and in furtherance of any previous examples, a computer implemented method includes disassembling the binaries prior to the determination of the basic blocks of instructions and use the disassembled binaries to determine the basic blocks of instructions.

In a fourteenth example and in furtherance of any previous examples, a computer implemented method includes processing each basic block of instruction to end with a respective control flow instruction based on a flow of execution through a basic block of instruction.

In a fifteenth example and in furtherance of any previous examples, a computer implemented method includes determining that at least one of the basic block of instructions includes an indirect jump instruction when no control flow route exists between a "from" address of a frame and a "to" address of an immediate previous frame, and indicating the immediate previous frame having the to address as valid.

In a sixteenth example and in furtherance of any previous examples, a computer implemented method includes processing one or more control flow routes defines one of a path of execution through the basic blocks of instructions through a function, and defines the path of execution through the basic block of instructions through two or more different functions.

In a seventeenth example and in furtherance of any previous examples, a computer implemented method includes determining that a "from" address for a frame and "to" address of an immediate previous frame are within a same symbol range, and validating the immediate previous frame without determining whether at least one control flow route exists between the "from" address of the frame and the "to" address of the immediate previous frame on the call stack.

In an eighteenth example and in furtherance of any previous examples, a non-transitory computer-readable storage medium, including a plurality of instructions, that when executed, enable processing circuitry to obtain a call stack for binaries, the call stack comprising a plurality of frames, each frame comprising a "from" address and a "to" address for a call instruction, determine basic blocks of instructions for the binaries, each basic block of instruction comprising one or more instructions, and traverse the call stack to validate from/to address pairs of sequential frames based on control flow routes existing between "from" addresses and "to" addresses of the from/to address pairs through the basic blocks of instructions, each from/to address pair comprising a "from" address of a frame and a "to" address of an immediate previous frame on the call stack.

In a nineteenth example and in furtherance of any previous examples, a non-transitory computer-readable storage medium, including a plurality of instructions, that when executed, enable processing circuitry to attempt to trace a control flow route from a "to" address to a "from" address of an from/to address pair through the basic blocks of instruction, validate the frame having the "to" address when at least one control flow route can be traced, and invalidate the frame having the "to" address and previous frames on the call stack when at least on control flow route not exist.

In a twentieth example and in furtherance of any previous examples, a non-transitory computer-readable storage medium, including a plurality of instructions, that when executed, enable processing circuitry to traverse the call stack from top to bottom until the call stack is fully traversed or at least one control flow route does not exist between a from/to address pair.

In a twenty-first example and in furtherance of any previous examples, a non-transitory computer-readable storage medium, including a plurality of instructions, that when executed, enable processing circuitry to disassemble the binaries prior to the determination of the basic blocks of instructions and use the disassembled binaries to determine the basic blocks of instructions.

In a twenty-second example and in furtherance of any previous examples, a non-transitory computer-readable storage medium, including a plurality of instructions, that when executed, enable processing circuitry to process each basic block of instruction to end with a respective control flow instruction based on a flow of execution through a basic block of instruction.

In a twenty-third example and in furtherance of any previous examples, a non-transitory computer-readable storage medium, including a plurality of instructions, that when executed, enable processing circuitry to determine that at least one of the basic block of instructions includes an indirect jump instruction when no control flow route exists between a "from" address of a frame and a "to" address of an immediate previous frame, and indicate the immediate previous frame having the "to" address is valid.

In a twenty-fourth example and in furtherance of any previous examples, a non-transitory computer-readable storage medium, including a plurality of instructions, that when executed, enable processing circuitry to process one or more control flow routes defines one of a path of execution through the basic blocks of instructions through a function, and defines the path of execution through the basic block of instructions through two or more different functions.

In a twenty-fifth example and in furtherance of any previous examples, a non-transitory computer-readable storage medium, including a plurality of instructions, that when executed, enable processing circuitry to determine that a "from" address for a frame and "to" address of an immediate previous frame are within a same symbol range, and validate the immediate previous frame without determining whether at least one control flow route exists between the "from" address of the frame and the "to" address of the immediate previous frame on the call stack.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory to store executable computer program instructions; and
   processing circuitry coupled with the memory, the processing circuitry operable to execute the instructions, that when executed, enable the processing circuitry to:
   obtain a call stack for binaries of data associated with one or more call instructions, the call stack comprising a sequence of frames, each frame comprising a "from" address and a "to" address for a call instruction;
   determine basic blocks of instructions for the binaries, each basic block of instructions comprising one or more instructions;
   traverse the call stack to validate from/to address pairs of sequential frames based on control flow routes existing between "from" addresses and "to" addresses of the from/to address pairs associated with the basic blocks of instructions, each from/to address pair comprising a "from" address of a frame and a "to" address of an immediate previous frame on the call stack; and
   storage coupled with the processing circuitry, the storage to store the call stack, and the processing circuitry to obtain the call stack for the binaries from the storage.

2. The apparatus of claim 1, the processing circuitry is further to:
   trace a control flow route from a "to" address to a "from" address of an from/to address pair associated with the basic blocks of instruction;
   validate the frame having the "to" address responsive to at least one control flow route that can be traced; and
   invalidate the frame having the "to" address and previous frames on the call stack in response to at least on control flow route not existing.

3. The apparatus of claim 1, the processing circuitry is to traverse the call stack from top to bottom until the call stack is fully traversed or at least one control flow route does not exist between a from/to address pair.

4. The apparatus of claim 1, the processing circuitry is to disassemble the binaries prior to the determination of the basic blocks of instructions and use the disassembled binaries to determine the basic blocks of instructions.

5. The apparatus of claim 1, wherein each basic block of instruction ends with a respective control flow instruction based on a flow of execution associated with the basic block of instruction.

6. The apparatus of claim 1, the processing circuitry is further to:
   determine that at least one of the basic block of instructions includes an indirect jump instruction when no control flow route exists between a "from" address of a frame and a "to" address of an immediate previous frame; and
   indicate that the immediate previous frame having the "to" address is valid.

7. The apparatus of claim 1, wherein one or more control flow routes defines one of a path of execution through the basic blocks of instructions through a function, and defines the path of execution through the basic block of instructions through two or more different functions.

8. The apparatus of claim 1, the processing circuitry is further to:
   determine that a "from" address for a frame and "to" address of an immediate previous frame are within a same symbol range; and
   validate the immediate previous frame based on the determination, wherein the validation of the immediate previous frame is performed without determining whether at least one control flow route exists between the "from" address of the frame and the "to" address of the immediate previous frame on the call stack.

9. The apparatus of claim 1, further comprising:
   the storage to store the call stack to comprise a model specific register (MSR); and
   the processing circuitry to obtain the call stack for the binaries from the MSR of the storage.

10. A computer-implemented method, comprising:
    obtaining, via processing circuitry, a call stack for binaries of data associated with one or more call instructions, the call stack comprising a sequence of frames, each frame comprising a "from" address and a "to" address for a call instruction;
    determining, via the processing circuitry, basic blocks of instructions for the binaries, each basic block of instruction comprising one or more instructions; and
    traversing, via the processing circuitry, the call stack to validate from/to address pairs of sequential frames based on control flow routes existing between "from" addresses and "to" addresses of the from/to address pairs associated with the basic blocks of instructions, each from/to address pair comprising a "from" address of a frame and a "to" address of an immediate previous frame on the call stack.

11. The computer-implemented method of claim 10, comprising:
    tracing a control flow route from a "to" address to a "from" address of an from/to address pair through the basic blocks of instruction;
    validating the frame having the "to" address responsive to at least one control flow route that can be traced; and
    invalidating the frame having the "to" address and previous frames on the call stack in response to at least on control flow route not existing.

12. The computer-implemented method of claim 10, comprising traversing the call stack from top to bottom until the call stack is fully traversed or at least one control flow route does not exist between a from/to address pair.

13. The computer-implemented method of claim 10, comprising disassembling the binaries prior to the determination of the basic blocks of instructions and use the disassembled binaries to determine the basic blocks of instructions.

14. The computer-implemented method of claim 10, wherein each basic block of instruction to end with a respective control flow instruction based on a flow of execution through a basic block of instruction.

15. The computer-implemented method of claim 10, comprising:
    determining that at least one of the basic block of instructions includes an indirect jump instruction when no control flow route exists between a "from" address of a frame and a "to" address of an immediate previous frame; and
    indicating that the immediate previous frame having the "to" address as valid.

16. The computer-implemented method of claim 10, wherein one or more control flow routes defines one of a path of execution through the basic blocks of instructions through a function, and defines the path of execution through the basic block of instructions through two or more different functions.

17. The computer-implemented method of claim 10, comprising:

determining that a "from" address for a frame and "to" address of an immediate previous frame are within a same symbol range; and validating the immediate previous frame based on the determination, wherein the validation of the immediate previous frame is performed without determining whether at least one control flow route exists between the "from" address of the frame and the "to" address of the immediate previous frame on the call stack.

18. A non-transitory computer-readable storage medium, comprising a plurality of executable computer program instructions, that when executed, enable processing circuitry to:

obtain a call stack for binaries from a storage, the call stack comprising a sequence of frames of data associated with one or more call instructions, each frame comprising a "from" address and a "to" address for a call instruction;

determine basic blocks of instructions for the binaries, each basic block of instructions comprising one or more instructions; and traverse the call stack to validate from/to address pairs of sequential frames based on control flow routes existing between "from" addresses and "to" addresses of the from/to address pairs associated with the basic blocks of instructions, each from/to address pair comprising a "from" address of a frame and a "to" address of an immediate previous frame on the call stack.

19. The non-transitory computer-readable storage medium of claim 18, comprising a plurality of instructions, that when executed, enable processing circuitry to:

trace a control flow route from a "to" address to a "from" address of an from/to address pair associated with the basic blocks of instruction;

validate the frame having the "to" address responsive to at least one control flow route that can be traced; and invalidate the frame having the "to" address and previous frames on the call stack in response to at least on control flow route not existing.

20. The non-transitory computer-readable storage medium of claim 18, comprising a plurality of instructions, that when executed, enable processing circuitry to traverse the call stack from top to bottom until the call stack is fully traversed or at least one control flow route does not exist between a from/to address pair.

21. The non-transitory computer-readable storage medium of claim 18, comprising a plurality of instructions, that when executed, enable processing circuitry to disassemble the binaries prior to the determination of the basic blocks of instructions and use the disassembled binaries to determine the basic blocks of instructions.

22. The non-transitory computer-readable storage medium of claim 18, wherein each basic block of instruction to end with a respective control flow instruction based on a flow of execution associated with a basic block of instruction.

23. The non-transitory computer-readable storage medium of claim 18, comprising a plurality of instructions, that when executed, enable processing circuitry to:

determine that at least one of the basic block of instructions includes an indirect jump instruction when no control flow route exists between a "from" address of a frame and a "to" address of an immediate previous frame; and indicate that the immediate previous frame having the "to" address is valid.

24. The non-transitory computer-readable storage medium of claim 18, wherein one or more control flow routes defines one of a path of execution through the basic blocks of instructions through a function, and defines the path of execution through the basic block of instructions through two or more different functions.

25. The non-transitory computer-readable storage medium of claim 18, comprising a plurality of instructions, that when executed, enable processing circuitry to:

determine that a "from" address for a frame and "to" address of an immediate previous frame are within a same symbol range; and validate the immediate previous frame based on the determination, wherein the validation of the immediate previous frame is performed without determining whether at least one control flow route exists between the "from" address of the frame and the "to" address of the immediate previous frame on the call stack.

* * * * *